No. 691,896. Patented Jan. 28, 1902.
C. L. DAHLBERG.
TABULATING SCALE FOR TYPE WRITERS.
(Application filed Dec. 31, 1900.)
(No Model.)
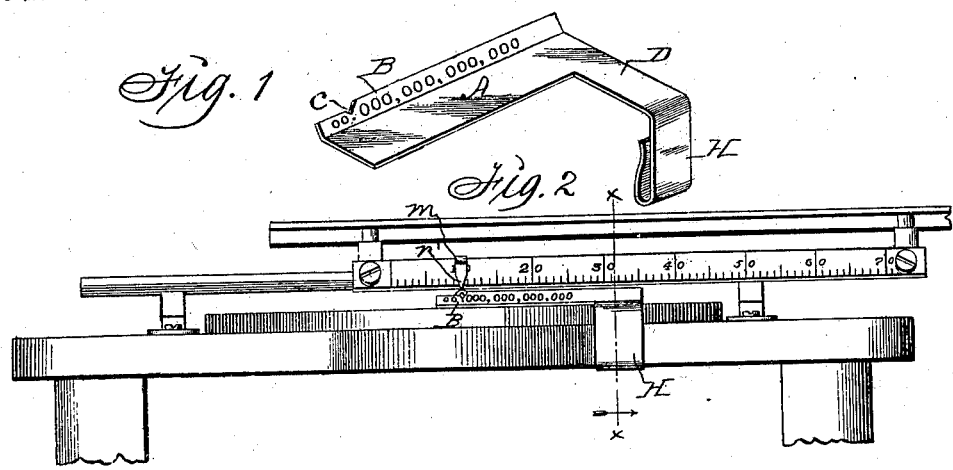
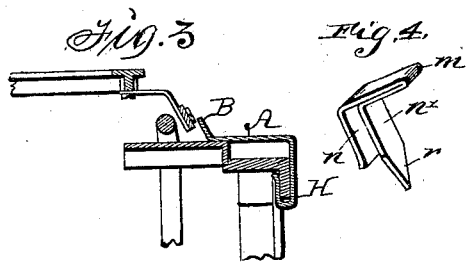

UNITED STATES PATENT OFFICE.

CHARLES L. DAHLBERG, OF DES MOINES, IOWA.

TABULATING-SCALE FOR TYPE-WRITERS.

SPECIFICATION forming part of Letters Patent No. 691,896, dated January 28, 1902.

Application filed December 31, 1900. Serial No. 41,590. (No model.)

*To all whom it may concern:*

Be it known that I, CHARLES L. DAHLBERG, a citizen of the United States, residing at Des Moines, in the county of Polk and State of Iowa, have invented a new and useful Tabulating-Scale for Type-Writers, of which the following is a specification.

Heretofore scales and pointers have been fixed to type-writers to serve as guides for adjusting the carriage relative to the margins required on sheets of paper, for starting lines at different points between the margins, and to facilitate the correction of errors. Auxiliary scales and pointers have also been fixed to machines to facilitate tabulating a plurality of amounts expressed by numerals in such a manner that all the figures and punctuation-marks would be in vertical alinement on the page.

My object is to provide an auxiliary scale made complete in one piece and adapted to be detachably and adjustably connected with the frame of the machine and also to provide a pointer complete in one piece and specially adapted to be adjustably connected with a fixed scale on a sliding carriage to be used advantageously with my auxiliary scale in tabulating.

My invention consists in the auxiliary scale and pointer applied and utilized on a typewriter, as hereinafter set forth, pointed out in my claim, and illustrated in the accompanying drawings, in which—

Figure 1 is a perspective view of my auxiliary scale specially adapted to be detachably connected with the frame of a type-writer to be advantageously used in combination with a fixed scale and one or more pointers adjustably and detachably connected with the fixed scale. Fig. 2 shows the auxiliary scale and an adjustable pointer applied as required for practical use. Fig. 3 is a sectional view on the line $x\ x$ of Fig. 2, showing how the clasp of the auxiliary scale engages the angle-bar and front of the machine. Fig. 4 is a perspective view of a pointer specially adapted to be detachably and adjustably connected with fixed scales, as shown in Fig. 2.

The letter A designates the body portion of my auxiliary scale made of plate metal. It is oblong in form and has one edge portion or flange B extending at an angle of about forty-five degrees, so as to bring it into position relative to the fixed scale on the sliding carriage, as shown on Figs. 2 and 3. A notch $c$ at the end portion of the part B is adapted to serve as a guide in adjusting the carriage as required for locating one or more decimals in a column of figures.

D is an integral extension at the end of the body A and terminates in a clasp H, adapted to engage the angle-bar at the front of the frame, as shown in Figs. 2 and 3.

On the flange B on one side of the notch $c$ are two ciphers, ("00,") that may be termed the "zero" of the scale of ciphers in series of three—thus, "000," "000," "000"—that may be extended, as desired, to aline with lines of figures successively made in columns and tabulated statements varying from one (1) to hundreds, (100,) thousands, (1,000,) and millions, (1,000,000.)

A pointer made of a single elongated piece of thin and narrow flat metal bent into form, as shown in Fig. 4, is adapted to be detachably and adjustably placed on a fixed scale. The central portion doubled together is adapted to serve as a handle $m$, and the two parallel end portions $n$ and $n'$ are adapted to stride and clasp the fixed scale, as shown in Fig. 2. The part $n'$ terminates in a pointed extension $r$, that projects down over a fixed scale, as shown in Fig. 2, and as required to bring the notch $c$ in the auxiliary scale in alinement with the point $r$ on the fixed scale. The top of the pointer will be practically even with the top of the fixed scale.

In the practical use of my invention it is obvious an adjustable pointer may be placed on a fixed scale to indicate where the first figure of any amount that can be expressed by decimals is to be placed on a sheet of paper, as required, to produce columns and to retain the decimals, successively printed in different lines, in perfect alinement, as illustrated by the following example:

| | | | | |
|---|---:|---:|---:|---:|
| Des Moines. | 100.00 | 500.00 | 340.00 | 230.00 |
| Iowa | 5,000.00 | 1,800.00 | 50.00 | 10.00 |
| Union | 500.00 | 600.00 | 600.00 | 1,000.00 |
| Wayne | 2,500.00 | 10.00 | 140.00 | 5.00 |
| | 8,100.00 | 2,910.00 | 1,130.00 | 1,245.00 |

After placing one or more adjustable pointers on a fixed scale to indicate where a decimal is to be placed on a sheet of paper in the machine it is only necessary to adjust the carriage so that the cipher on the auxiliary scale that corresponds with the left-end figure in the amount to be registered will be in alinement with a pointer on a fixed scale to locate the first figure of any decimal number and also the remainder of the decimals in any given amount in position on the sheet of paper to produce tabulated statements advantageously, as shown by the foregoing example.

Having thus described the purpose, construction, and application of my invention, its practical operation and utility will be readily understood by persons familiar with the art to which it pertains.

What I claim as new, and desire to secure by Letters Patent, is—

A tabulating-scale for type-writers, made of a single piece of plate metal, comprising a flat, oblong body portion having an inclined flange at one of its edges, a notch near the end of the flange, ciphers on the flange, and an integral right-angled extension at one end, terminating in a clasp adapted for fastening the scale to the frame of the machine, as shown and described, for the purposes stated.

CHARLES L. DAHLBERG.

Witnesses:
R. H. ORWIG,
THOMAS G. ORWIG.